United States Patent [19]

Hait

[11] Patent Number: 4,624,238
[45] Date of Patent: Nov. 25, 1986

[54] DEVICE INTERCHANGEABLE AS AN OUTDOOR STOVE AND A TABLE

[75] Inventor: Paul W. Hait, Saratoga, Calif.

[73] Assignee: Pyromid, Inc., Los Gatos, Calif.

[21] Appl. No.: 677,582

[22] Filed: Dec. 3, 1984

[51] Int. Cl.[4] .............................................. F24C 1/16
[52] U.S. Cl. .................................. 126/9 R; 126/9 B; 126/25 R; 126/305
[58] Field of Search ............... 126/9 R, 278, 9 B, 305, 126/25 R, 304 A, 25 AA, 30, 304 R, 31, 29, 1 R, 1 D; 99/447, 450, 339, 340

[56] References Cited

U.S. PATENT DOCUMENTS

| | | | |
|---|---|---|---|
| 1,403,842 | 1/1922 | Chambers et al. | 126/9 R |
| 2,119,799 | 6/1938 | Sivey | 126/9 R |
| 2,237,081 | 4/1941 | Owens | 125/25 R |
| 2,515,521 | 7/1950 | Loffredo | 126/9 R |
| 3,005,451 | 10/1961 | Richart | 126/9 R |
| 3,068,852 | 12/1962 | Purtzer | 126/25 R |
| 3,327,698 | 6/1967 | Leslie | 126/25 R |
| 3,489,131 | 1/1970 | Richins | 126/9 R |
| 3,765,397 | 10/1973 | Henderson | 126/9 R |
| 3,809,051 | 5/1974 | Giroux | 126/9 R |
| 3,880,139 | 4/1975 | Young | 126/9 R |
| 4,413,609 | 11/1983 | Tisdale | 126/25 R |
| 4,475,528 | 10/1984 | Kuchenbrod | 126/9 R |
| 4,489,706 | 12/1984 | Hait | 126/9 R |
| 4,508,094 | 4/1985 | Hait | 126/9 R |
| 4,531,505 | 7/1985 | Hait | 126/9 B |

FOREIGN PATENT DOCUMENTS

| | | | |
|---|---|---|---|
| 2709326 | 9/1978 | Fed. Rep. of Germany | 126/25 R |
| 1467646 | 3/1977 | United Kingdom | 126/9 R |
| 2074309 | 10/1981 | United Kingdom | 126/25 B |

Primary Examiner—James C. Yeung
Attorney, Agent, or Firm—Jack M. Wiseman

[57] ABSTRACT

The device of the present invention can be used as a cooking unit, or as a table, or as a suspended support. When the device is used as a cooking unit, a stand thereof supports a pan at the upper end of the stand. A larger, lower end of a hollow, truncated pyramidal support member is disposed on the pan. The smaller, upper end of the support member receives the smaller, lower end of a hollow, truncated pyramidal firebox. A fire grate is supported within the firebox intermediate its smaller, lower end and its larger, upper end. A cooking grill is also supported within the firebox above the fire grate, adjacent the larger, upper end of the firebox. To convert the cooking unit into a table, the pan, support member, firebox, fire grate, and cooking grill are removed from the stand. Then, the cooking grill and fire grate are successively disposed on the stand at the location previously occupied by the pan. The support member and firebox, which have hinged walls, are then individually folded into substantially flat configuration and are disposed above the fire grate and the cooking grill. The pan is disposed above the folded support member and the folded firebox and on top of the stand as a cover and is the table top surface for the table.

17 Claims, 11 Drawing Figures

DEVICE INTERCHANGEABLE AS AN OUTDOOR STOVE AND A TABLE

BACKGROUND OF THE INVENTION

1. Field of the Invention

The present invention relates in general to outdoor stoves, and more particularly to outdoor stoves which are collapsible for compactness.

2. Description of the Prior Art

Collapsible cooking units which may be assembled for us and disassembled for enclosure in a container for easy transportation and for facilitating storage are known. Such cooking units a disclosed in pending U.S. patent application Ser. No. 440,984, entitled "Convertible Cooking Unit", filed Nov. 12, 1982, U.S. Pat. No. 4,508,094, by Paul W. Hait, and in pending U.S. patent application Ser. No. 502,689, entitled "Convertible Cooking Unit With An Oven", filed June 9, 1983, U.S. Pat. No. 4,531,505, by Paul W. Hait and Dan Rohrer. The assignee of the present application is the assignee of the aforementioned applications. The individual cooking units described in these various patent applications are particularly adaptable for use out of doors as environmentally enclosed heating and/or cooking systems.

It is well-known that outdoor cooking units have been supported by stands, legs, carts and the like. However, such outdoor cooking units are not collapsible for facilitating the transporting thereof and for ease of storage as compact units.

Frequently, outdoor cooking units are specifically adapted either solely for use on patios for barbecuing and the like or for use while camping out of doors. Such cooking units may be disassemblable or collapsible to allow their easy storage or to facilitate the transporting thereof. In the particular instance of social activities on a patio, a table surface may be desired at times when cooking is not being performed. Because patio space is generally limited and due to the inconvenience of storing and rearranging a separate cooking unit and a table, it is beneficial if the same item were easily adaptable for use either as a table or as a cooking unit.

SUMMARY OF THE PRESENT INVENTION

An object of the present invention is to provide a device which may be used either as a table or as a cooking unit.

Another object of the present invention is to provide a device which may be easily adapted for use either as a table, a hanging support, or as a cooking unit and wherein a pan serves as a base for the cooking unit or as a cover used to form a container for storing or transporting a collapsed compact device.

Briefly, one embodiment of the present invention includes a stand for supporting a cooking unit above the ground. The device ay also be employed as a hanging support for objects through the use of suspended chains, wires, cables or the like in lieu of table legs. When the device of the present invention is used as a cooking unit, a flat pan is supported by the upper end of the stand. Supported by the pan is the larger, lower end of a hollow, truncated pyramidal support member. The smaller, upper end of the truncated pyramidal support member is formed with an open surface for receiving the smaller end of a hollow, inverted, truncated pyramidal firebox. A fire grate is disposed within the hollow, pyramidal firebox and is supported by the firebox intermediate the smaller, lower end and the larger, upper end of the pyramidal firebox. A cooking grill which is larger than the fire grate is also disposed in the firebox and is supported by the firebox above the fire grate and in the vicinity of the top of the firebox.

To convert the device of the present invention into a table, or a hanging support for objects, the hood, the cooking grill, the fire grate, the firebox, the support member, and the pan are successively removed. To assemble the table or the hanging support, first the cooking grill is placed upon the stand in the location previously occupied by the pan. Then, the fire grate is laid upon the cooking grill. The hood, the pyramidal support member and the pyramidal firebox are respectively folded into respective generally flat configurations through respective panels joined together along their edges by hinges and with a pair of opposing panels hinged intermediate their hinged edges. Thus, by pressing inward along the hinges located in the middle of opposing panels, the truncated pyramidal hood, support member and firebox, respectively, are folded into compact, generally flat configurations suitable for storage within the stand on top of the cooking grill and fire grate. After the fire grate, the support member, and the firebox have been laid on top of the cooking grill, the pan is inverted and placed down on the stand enclosing these items, thus providing a flat, table top surface or support platform.

An advantage of the present invention is that it provides a device that may be interchangeably used either for cooking or as a table or a hanging support.

Another advantage of the present invention is that it provides a device that may be easily adapted for use either as a table or as a cooking unit with a pan thereof used either as a table top or as a base for the cooking unit.

Another feature of the present invention is that the pan, when employed as a table top also serves as a cover for containing and concealing the remaining parts of the cooking unit.

Another feature of the present invention is a hinged plate at the bottom of the firebox that protects the pan from hot ashes or the like when the device is used as a cooking unit, thus protecting the pan from disfigurement to maintain a desired appearance for the pan when the device is used as a table.

DETAILED DESCRIPTION OF THE PREFERRED EMBODIMENT

Figure 1:
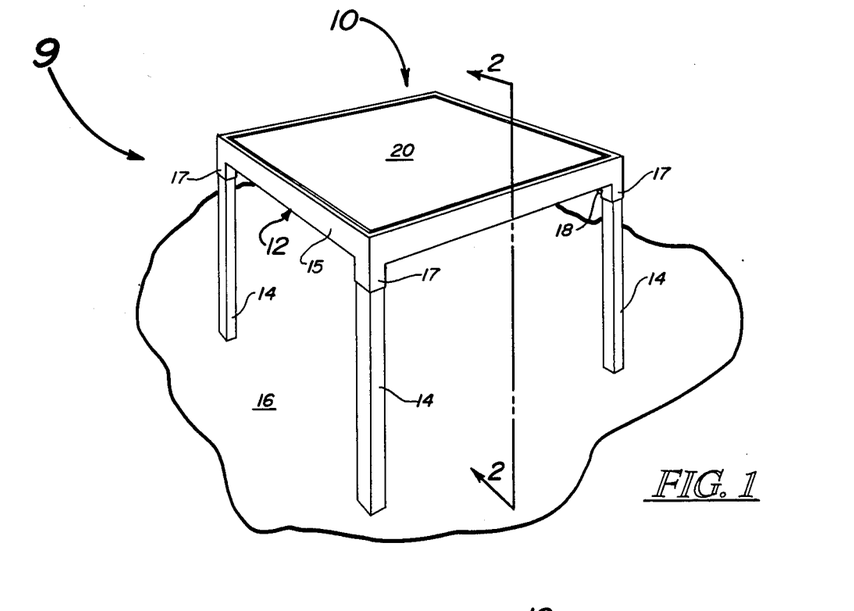
FIG. 1 is a diagrammatic, perspective view of a device embodying the present invention and illustrated for use as a table.

FIG. 1 depicts the device 9 embodying the present invention used as a table 10. The table 10 includes a stand 12 having a plurality of legs 14 shown resting upon a suitable supporting surface 16. The stand 12 also comprises a quadrilateral frame 15 with depending sockets 17 for detachably receiving the upper ends of the legs 14, respectively. Screws 18 detachably secure the legs 14 within the sockets 17, respectively. Thus, the legs 14 can be dismantled for compactness in storing or transporting the device 9 of the present invention. Disposed on the frame 15 at the upper end of the stand 12 is a quadrilateral pan 20 which provides a flat table top surface spanning across the upper surface of the stand 12 when the device 9 is used as a table 10.

When the pan 20 is removed from the top of the stand 12 (FIG. 2), a folded hood 90, a folded support member 22, a folded firebox 24, a fire grate 26, and a cooking grill 28 may be successively removed from a space within the top of the stand 12 previously covered by the pan 20. In the preferred embodiment, the support member 22, the firebox 24, and the hood 90 are made of stainless steel. The support member 22 (FIG. 3) comprises panels 32a-32d joined together along juxtaposed non-parallel edges thereof by suitable hinges 34. Each panel of a pair of opposing panels 32a-32d of the support member 22 is formed from plates 36 joined together by a suitable hinge 38 located intermediate the non-parallel edges thereof. The panels 32a-32d of the support member 22 are trapezoidal in configuration. The hinges 38 joining the plates 36 are located along the centerline of the panels 32b and 32d orthogonal to the parallel edges thereof. The hinges 34 and 38 allow the panels 32a and 32c to be disposed above one another with the folded panels 32b and 32d therebetween when folded into a substantially flat configuration. When the support member 22 is folded into a substantially planar shape, the hinges 38 are disposed adjacent to each other between the panels 32a and 32c. When the support member 22 is to be extended, the panels 32a and 32c of the support member 22 are moved for displacement relative to one another in the direction of the arrows 39 and 40 shown in FIG. 3. Thereupon, panels 32a-32d of the support member 22 form a hollow, truncated pyramid which is open at its larger and its smaller end.

The firebox 24 (FIG. 3) comprises panels 42a-42d joined together along juxtaposed non-parallel edges by suitable hinges 44. Each panel of a pair of opposing panels 42b-42d of the firebox 24 is formed from plates 46 joined together by a suitable hinge 48 located intermediate the non-parallel edges thereof. The panels 42a-42d of the firebox 24 are trapezoidal in configuration. The hinges 48 joining the plates 46 are located along the centerline of the panels 42b and 42d orthogonal to the parallel edges thereof. The hinges 44 and 48 allow the panels 42b and 42d to be disposed above one another with the folded panels 42b and 42d therebetween when folded into a substantially flat configuration. When the firebox 24 is folded into a substantially planar shape, the hinges 48 are disposed adjacent to each other between the panels 42a and 42c. When the firebox 24 is to be extended, the panels 42a and 42c of the firebox 24 are moved for displacement relative to one anoth in the direction of the arrows 47 and 48 shown in FIG. 3. There upon, panels 42a-42d of the firebox 24 form an inverted hollow, truncated pyramid which is open at both its larger end and its smaller end.

Figure 4:
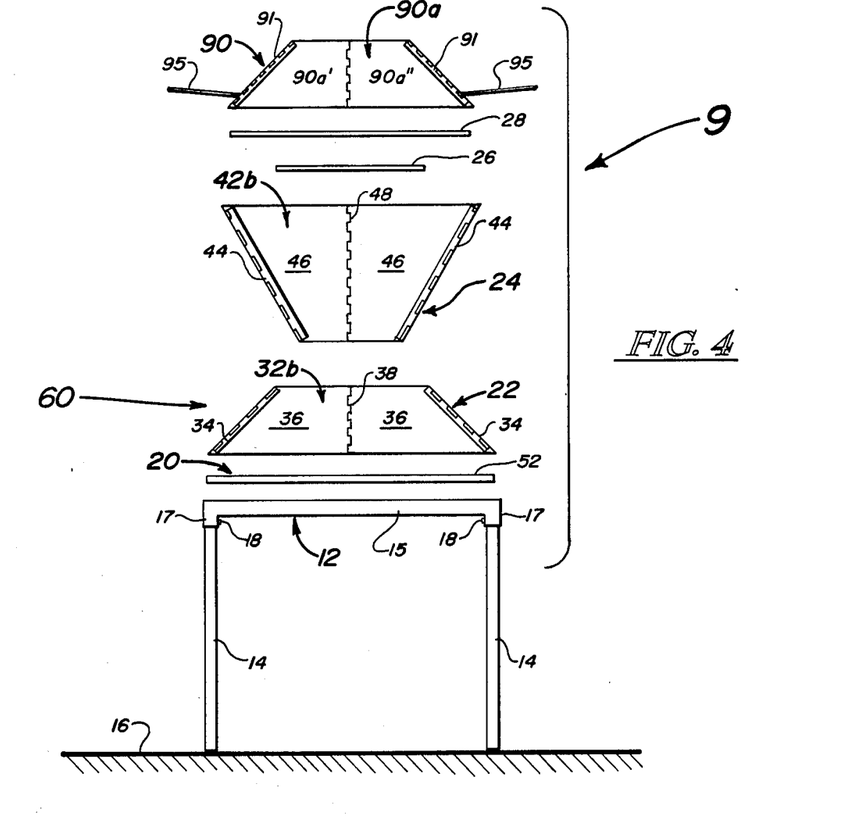
FIG. 4 is a diagrammatic, exploded, vertical section of the apparatus shown in FIG. 1 and illustrating the table, the pan, the extended support member, the extended firebox, the fire grate, the cooking grill and the extended hood without its top foldable members.
Figure 5:
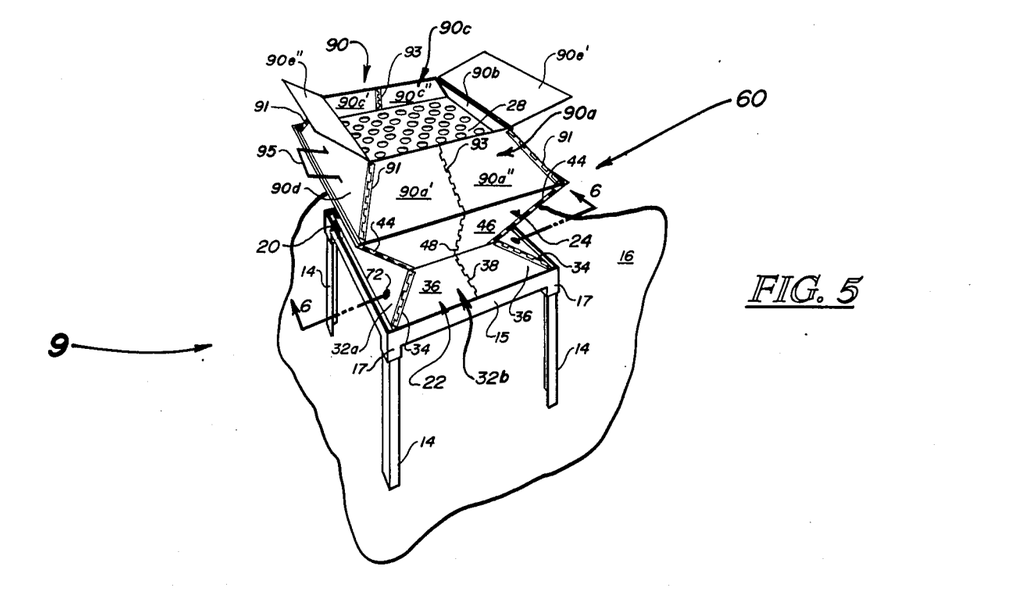
FIG. 5 is a diagrammatic, perspective view of the device shown in FIG. 1 assembled for use as a cooking unit.
Figure 6:
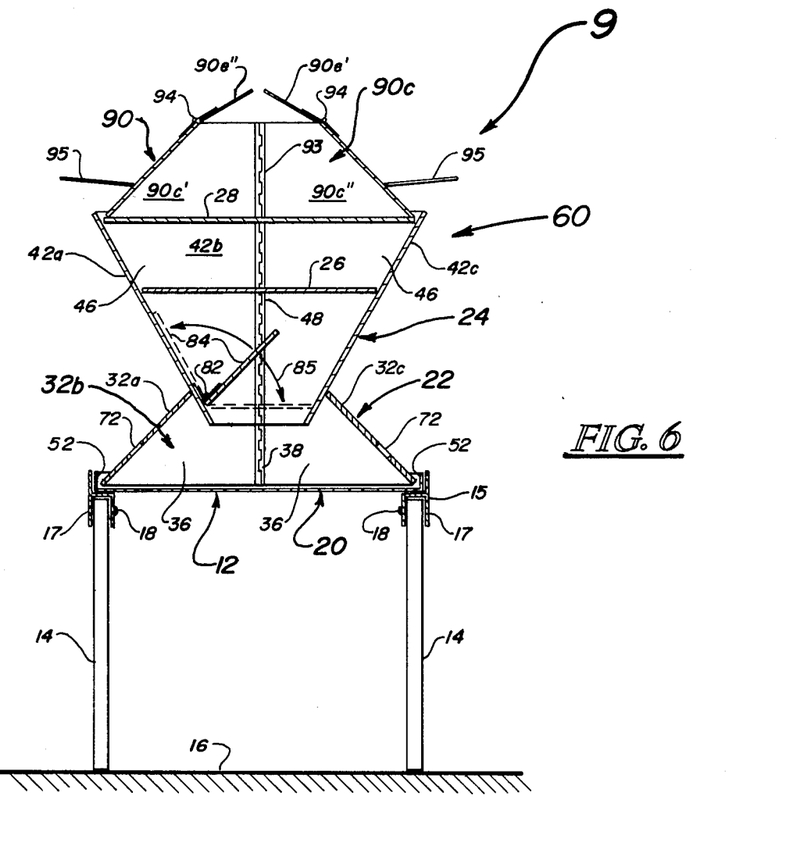
FIG. 6 is a diagrammatic, sectional view of the assembled cooking unit as shown in FIG. 5 taken along the line 6—6 of FIG. 5.
Figure 6A:
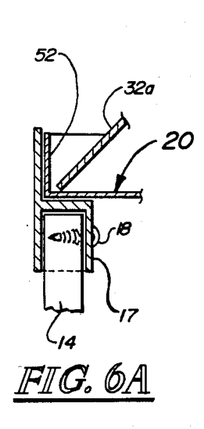
FIG. 6A is an enlarged, vertical sectional view of the upper portion of the stand and the lower portion of the assembled cooking unit of the device shown in FIG. 5.
Figure 7:
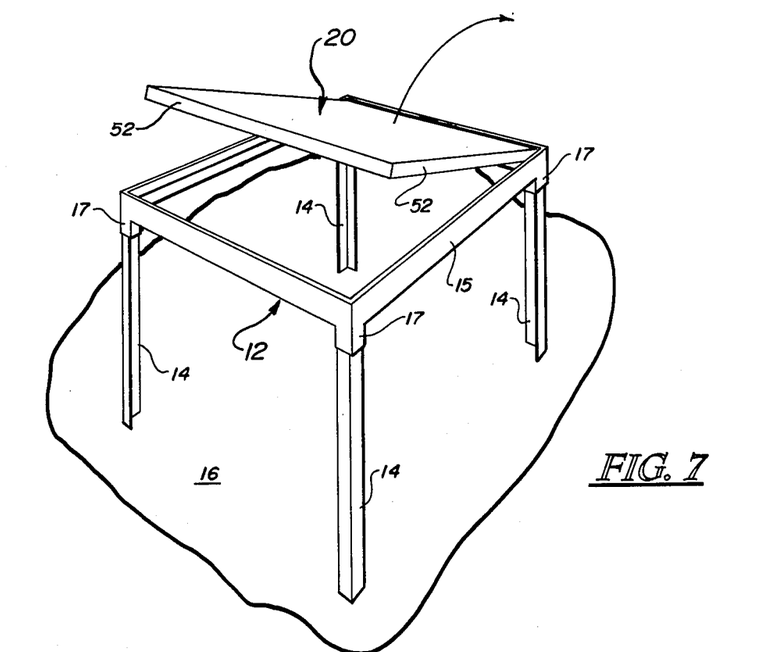
FIG. 7 is a fragmentary diagrammatic, perspective view of the device shown in FIG. 1 illustrating the removal of the pan prior to the conversion of the device from a table into a cooking unit.

To convert the device 9 from the table 10 into a cooking unit 60, the pan 20 is disposed on the frame 15 of the stand 12 (FIGS. 4 and 5). Formed along each of the edges of the pan 20 is an upstanding flange 52 (FIG. 7). The flanges 52 are formed to project orthogonally along the periphery of the surface of the pan 20. As shown in FIG. 5, the pan 20 spans the upper surface of the stand 12. When the pan 20 is disposed on the frame 15 of the stand 12 to form the table 10, the flanges 52 are directed downwardly and engage the stand 12 as a cover to contain the folded hood 90, the folded support member 22, the folded firebox 24, the fire grate 26 and the cooking grill 28. When the pan 20 is disposed upon the frame 15 of the stand 12 to form the cooking unit 60, the flanges 52 are directed upwardly. The support member 22 is extended outwardly (FIGS. 4–6) and the larger end of its truncated pyramidal support member 22 is disposed on the pan 20. The larger end of the support member 22 is disposed on the frame of the stand 12 within the perimetric edges of the frame 15. When the support member 22 is thus extended and seated on the pan 20, the height of the pyramidal support member 22 projects above the pan 20 and the support member 22 presents an opening at its upper smaller end (FIG. 6).

The opening provided at the upper, smaller end of the support member 22 receives the smaller, lower end of the firebox 24 after the firebox 24 has been extended into an inverted, truncated pyramid. The panels 32a-32d of the support member 22 (FIG. 3) support the firebox 24 (FIG. 6) by engagement with the panels 42a-42d (FIG. 3) intermediate the upper and lower ends thereof. To provide mechanical stability when the firebox 24 is received into and supported by the support member 22, the smaller end of the firebox 24 extends downwardly a substantial distance into the support member 22 (FIG. 6) in close proximity to the pan 20 upon which the support member 22 is seated.

With the firebox 24 supported by the support member 22 and with the upper, larger open end of the firebox 24 projecting upwardly above the support member 22, the firebox 24 is prepared to receive the fire grate 26 and the cooking grill 28.

Both the fire grate 26 and the cooking grill 28, in the exemplary embodiment, are quadrilateral in configuration. The cooking grill 28 is slightly smaller in dimension than the size of the opening in the larger, upper end of the inverted, pyramidal firebox 24. The size of the fire grate 26 is smaller than the larger, upper end of the firebox 24 and larger than the smaller, lower end of the firebox 24. The fire grate 26 is disposed in the firebox 24 (FIG. 6) before the cooking grill 28 is disposed in the firebox 24. The fire grate 26 is supported intermediate the upper and lower ends of the firebox 24 through engagement with the panels 42a–42d of the firebox 24. When the cooking grill 28 is placed in the firebox 24 subsequent to the installation of the fire grate 26, the cooking grill 28 is supported above the fire grate 26 and adjacent the larger, upper end of the firebox 24. Hence, the cooking unit 60 is now prepared for cooking food on the grill 28.

When the cooking unit 60 is used for grill cooking, combustible material, such as charcoal, is placed upon the fire grate 26 and the food to be cooked is placed on the cooking grill 28. Air for combustion flows through the fire grate 26 and the cooking grill 28. The fire grate 26 and cooking grill 28 are fabricated from perforated sheet metal stock, such as stainless steel. However, the perforations for the fire grate 26 and the cooking grill 28 are similar in construction and size. The construction and size of the perforations are shown in FIG. 5 for the cooking grill 28. The construction of the cooking grill 28 lends itself to improved heat use at its surface and thus the lessening of heat losses, as contrasted to the ordinary open wire grill. It is easier to start a fire from combustible material employing the construction of the fire grate 26. In addition, longitudinally displaced vent holes 72 (FIG. 5) are formed through each of the walls 32a and 32c in the support member 22. The vent holes 72 are located adjacent the lower, larger end of the panels 32a and 32c. Air flows through vent holes 72 for combustion and enters the support member 22 before passing through the opening in the firebox 24 to reach the combustible material on the fire grate 26. The pyramidal configuration of the support member 22 and the firebox 24 provides improved heat flow paths to enhance the uniformity of heat at the cooking grill 28 and also provides greater space efficiency for a cooking unit.

In the preferred embodiment, a hinge 82 (FIG. 6) is secured to the panel 42a immediately above the smaller, lower end of the firebox 24 for attaching a quadrilateral movable panel 84 thereto. When the device 9 is to be collapsed for conversion from the cooking unit 60 to the table 10, panel 84 (shown in dotted line in FIG. 6) is disposed in a generally upright position along the outer panel 42a to which the hinge 82 is secured. If the device 9 is to be used as the cooking unit 60, then the panel 84, which is slightly larger than the opening in the nadir of the firebox 24, is moved in the direction of an arrow 85 (FIG. 6) to a horizontal position across the opening in the firebox 24. The panel 84 is supported in this horizontal position by the hinge 82 and the other panels of the firebox 24. The movable panel 84 is disposed across the open end of the firebox 24 to prevent hot ashes or the like from falling through the fire grate 26 onto the pan 20. It is desired to protect the pan 20 from becoming unsightly when serving as the top of the table 10. The panel 84 permits the flow of air through the support member 22 and the firebox 24, while preventing hot coals and ashes from falling onto the pan 20.

Figures 2, 2A:
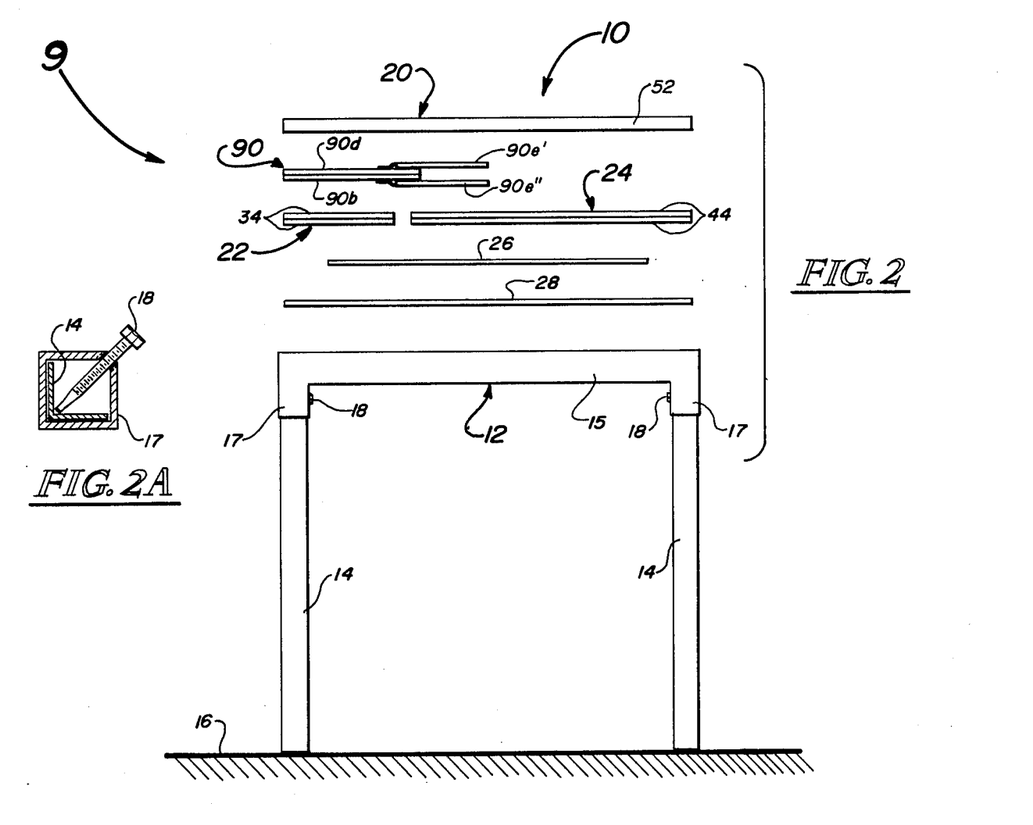
FIG. 2 is a diagrammatic, exploded, elevation view of the device illustrated in FIG. 1 taken along the line 2—2 of FIG. 1 and showing a pan, a folded hood, a folded support member, a folded firebox, a fire grate, a cooking grill and a table stand.
FIG. 2A is an enlarged vertical sectional view of a table leg secured to a table base of a table stand for the device shown in FIG. 1.
Figure 3:
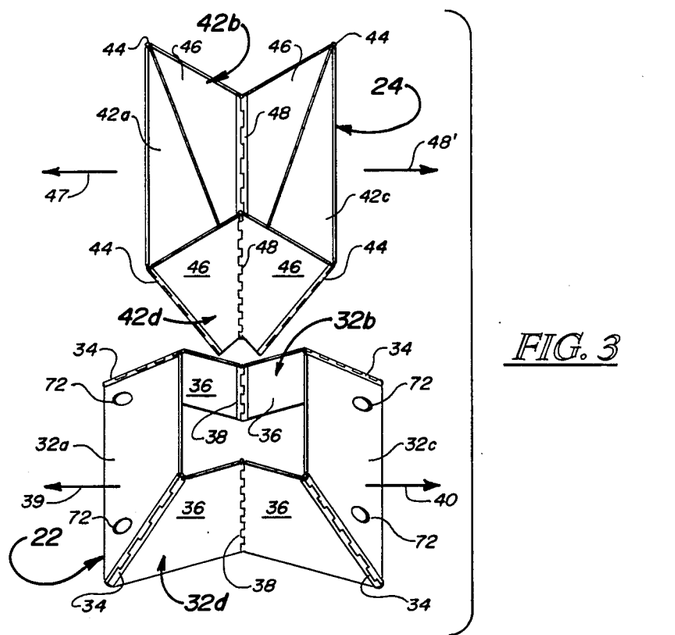
FIG. 3 is a fragmentary diagrammatic, exploded elevation view of the support member and the firebox.

When the cooking unit 60 is no longer needed for cooking, it may easily be disassembled for restoring the table 10 by successively removing the hood 90, the cooking grill 28, the fire grate 26, the pyramidal firebox 24, and the pyramidal support member 22. Then, the pan 20 is removed from the top of the stand 12 as shown in FIG. 7. To reassemble the table 10, first the cooking grill 28 and then the fire grate 26 are placed on the top of the stand 12 as shown in FIG. 2. The cooking grill 28 is of sufficient size to be supported by the stand 12 and spans the upper surface of the stand 12. Then the hood 90, the firebox 24 and the support member 22 are successively folded and placed on top of the cooking grill 28 as shown in FIG. 2. Finally, the pan 20 with the flanges 52 directed downwardly is disposed on the top of the stand 12 to form the table 10.

Figure 8:
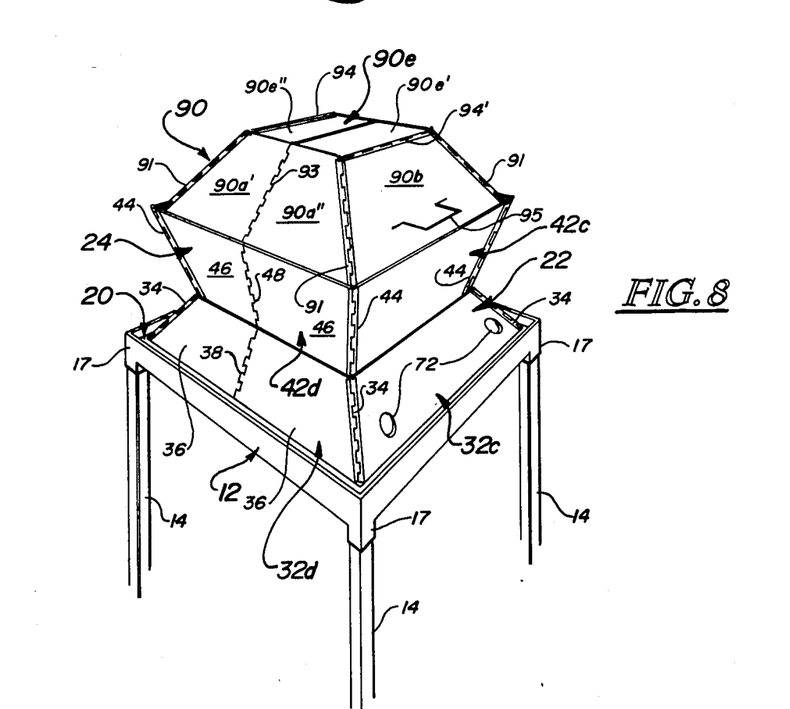
FIG. 8 is a diagrammatic, perspective view of the device shown in FIG. 1 assembled for use as a cooking unit with a hood disposed over and supported by the firebox.

Illustrated in FIGS. 6 and 8 is the cooking unit 60 with the collapsible, hollow hood 90. The hood 90 has a truncated, pyramidal configuration and has its larger end disposed on the larger end of the firebox 24. The truncated, pyramidal hood 90 comprises side panels 90a–90d and a top panel 90e. Each of the side panels 90a–90d has a trapezoidal configuration and the top panel 90e has a rectangular configuration. The panels 90a–90d are joined together along juxtaposed, non-parallel edges by suitable hinges 91. Each panel of a pair of opposing panels 90a and 90c is formed from plates 90a', 90a" and 90c' and 90c" joined together by a suitable hinge 93 located intermediate the non-parallel edges thereof. More particularly, the hinges 93 are located along the centerline of the panels 90a and 90c orthogonal to the parallel edges thereof. The hinges 91 and 93 allow the panels 90b and 90d to be disposed above one another with the folded panels 90a and 90c therebetween when folded into a substantially flat configuration. When the hood 90 is folded into a substantially planar shape, the hinges 93 are disposed adjacent to each other between the panels 90b and 90d. When the hood 90 is to be extended, the panels 90b and 90d are moved for displacement relative to one another. Thereupon, the panels 90a–90d of the hood 90 form a hollow, truncated pyramid which is open at both its larger end and its smaller end.

The top panel 90e (FIGS. 5 and 8) includes separable sections 90e' and 90e". The section 90e" is hingedly connected to the side panel 90d by a hinge 94 and the section 90e' is hingedly connected to the side panel 90b by a hinge 94' (FIGS. 5 and 8). When the hood 90 is extended, the top panel 90e is moved to overlie the open end of the side panels 90a–90d at the smaller, upper end thereof. The top panel 90e when overlying the upper end of the panels 90a–90d is supported by the panels 90a–90d. When the hood 90 is collapsed, the sections 90e' and 90e" of the top panel 90e are moved to abut against the outer walls of the side panels 90b and 90d, respectively.

The top panel sections 90e' and 90e" are pivoted outwardly during the cooking of food to enable the food being cooked to be inspected. In addition thereto, the top panel sections 90e' and 90e" are pivoted inwardly during the cooking of food to be used as reflectors during the smoking of meat or fish.

Pivotally attached to the panels 90b and 90d of the hood 90 are suitable handles 95 (FIGS. 5 and 8) which are gripped by an operator to facilitate the removal of the hood 90 from the firebox 24 or the seating of the hood 90 on the firebox 24.

Figure 9:
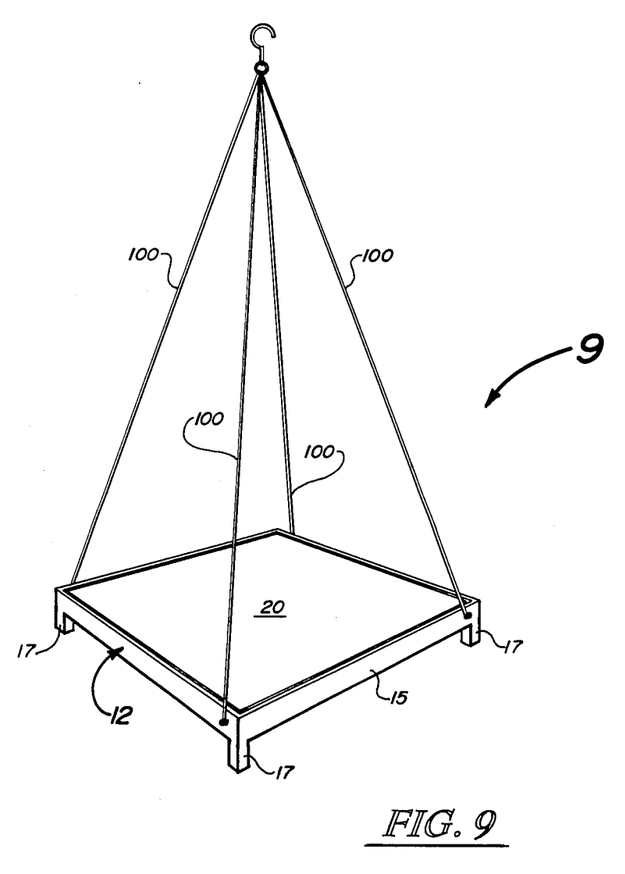
FIG. 9 is a diagrammatic illustration of the device shown in FIG. 1 used as a suspended support or a suspended support platform for objects.

Illustrated in FIG. 9 is the use of wires, cables, chains 100 or the like employed to suspend the device 9 when used as a support platform or a support for objects. The legs 14 are removed. The wires or chains 100 are detachably secured to the frame 15 so that the device 9 may be suspended from a rafter or the like. In so doing, the pan 20 serves as a support for a suitable object, such as a plant or the like.

The heat generated by the igniting of kindling material on the hinged plate 84 is reflected by virtue of the flat wall surfaces of the firebox 24. The heat so generated is thereby made more intense on the fuel grate 26 while heat losses are reduced. The reflective surfaces of the stainless steel walls of the firebox reduce heat absorption and, thus, losses.

Through the use of an inverted, truncated pyramidal configuration for the firebox 24, the cooking unit 10 of the present invention is substantially more fuel efficient. The truncated, pyramidal configuration of the firebox 24 is able to efficiently reflect the heat generated from the fire grate 26 to the cooking grill 28. Black surfaces absorb heat rather than efficiently reflect the heat. In addition to the foregoing, the present invention provides a foldable cooking unit that is compact to facilitate the transportation and storage thereof.

Through the use of the truncated, pyramidal hood 90, the flat, angled reflective walls thereof redirect the heat efficiently back on the cooking grill. The efficient radiation of the heat back on the cooking grill 28 has been found to heat the grill 28 sufficiently to provide a self-cleaning action.

The flaps 90e' and 90e'' of the hood 90, when in the opened position, permit accessibility to the cooking grill 28 with the use of cooking utensils for turning, moving, inspecting and the like.

What is claimed is:
1. A cooking unit comprising:
 (a) a frame;
 (b) a support member of pyramidal truncated configuration disposed on said frame, said support member having an open upper end;
 (c) a firebox of an inverted pyramidal configuration disposed on said support member, said firebox having an open lower end, the lower end of aid firebox being in telescoping relation with the upper end of said support member to be supported thereby; and
 (d) a pan disposed on said frame below said support member to provide a base for supporting said support member, said pan being formed with flanges along the perimeter thereof, said flanges being disposed downwardly to depend from said pan when said pan is used as a cover and as a suoport surface, and said flanges being disposed upwardly upstanding from said pan when said pan is used as a base for said support member,
 (e) said support member comprising panels having trapezoidal configurations and adjacent non-parallel edges of said panels being hingedly connected for folding and extending said support member,
 (f) said firebox comprising panels having trapezoidal configurations and adjacent non-parallel edges of said panels of said firebox being hingedly connected for folding and extending said firebox.

2. A cooking unit as claimed in claim 1 wherein each panel of a confronting pair of panels of said support member comprises adjacent plates hingedly connected for folding said support member into a generally flat configuration, and wherein each panel of a confronting pair of panels of said firebox comprises adjacent plates hingedly connected for folding said firebox into a generally flat configuration.

3. A cooking unit as claimed in claim 2 and comprising a fire grate disposed within said firebox for supporting combustible material, a cooking grill disposed within said firebox aboe said fire grate for supporting food to be cooked, and a panel hingedly attached to a panel of said firebox other than said confronting pair of panels of said firebox for overlying the open lower end of said firebox to protect said pan.

4. A cooking unit as claimed in claim 3 wherein said cooking grill and said fire grate are removed from said firebox; said firebox is removed from said support member and folded to a generally flat configuration; said support member is removed from said pan and folded to a generally flat configuration; said pan is removed from said frame; said cooking grill is disposed on said frame; said fire grate, said folded firebox and said folded support member are disposed on said cooking grill; and said pan is disposed to provide a cover for containing said folded firebox, said folded support member, said fire grate and said cooking grill on said frame and to provide a support surface.

5. A cooking unit as claimed in claim 1 wherein said frame includes a plurality of depending sockets, said cooking unit comprises a plurality of legs detachably received by said sockets for supporting said frame.

6. A cooking unit as claimed in claim 1 wherein said firebox has its lower end received by said support member.

7. A cooking unit as claimed in claim 1 and comprising a hood disposed on said firebox, said hood comprises side panels having trapezoidal configurations and adjacent non-parallel edges of said panels are hingedly connected for folding and extending said hood.

8. A cooking unit as claimed in claim 7 wherein each side panel of a confronting pair of side panels of said hood comprise adjacent plates hingedly connected for folding said hood into a generally flat configuration, said hood further comprises a top panel having a separable top section hingedly connected to one of side panels of said hood other than said confronting pair of side panels of said hood.

9. A device interchangeably used as a cooking unit and as a table comprising:
 a stand adapted to be disposed on a supporting surface;
 a pan disposed at the upper end of said stand to be supported thereby when said device is used as a cooking unit, said pan providing a table surface spanning across the upper surface of the stand when said device is used as a table;
 a hollow, truncated pyramidal support member comprising a plurality of hingedly connected panels, said support member when extended to be used as part of said cooking unit having a wider, lower end disposable on said pan and a smaller, upper end projecting above said pan, said support member being foldable into a relatively flat configuration for storage between the upper end of said stand and said pan when said device is used as a table; and
 a hollow, truncated pyramidal firebox comprising a plurality of hingedly connected panels, said firebox having a smaller end received within said support member through the opening provided in the upper end of said support member when said device is used as a cooking unit, said firebox being formed with a larger opening located at the upper end thereof projecting upwardly above said pan and said support member, said firebox being folded into a substantially flat configuration for storage between the upper end of said stand and said pan when said device is used as a table.

10. A device as claimed in claim 9 and comprising
(a) a fire grate received in said firebox to be supported thereby intermediate said smaller, lower end and said larger, upper end thereof through engagement between said fire grate and the panels of said firebox when said device is used as a cooking unit, said fire grate being stored between the upper end of said stand and said pan when said device is used as a table; and
(b) a cooking grill received in said firebox to be supported thereby above said fire grate and in the vicinity of said larger, upper end of said firebox when said device is used as a cooking unit, said cooking grill being disposed between the upper end of said stand and said pan when said device is used as a table, said cooking grill spanning across the upper surface of said stand when said device is used as a table.

11. A device interchangeably used as a cooking unit and as a table comprising:
(a) a stand adapted to be disposed on a supporting surface;
(b) a pan disposed at the upper end of said stand to be supported thereby when said device is used as a cooking unit, said pan providing a table surface spanning across the upper surface of the stand when said device is used as a table;
(c) a hollow, truncated pyramidal support member comprising a plurality of hingedly connected panels, said support member when extended to be used as a part of said cooking unit having a wider, lower end disposable on said pan and a smaller, upper end projecting above said pan, said support member being foldable into a relatively flat configuration for storage between the upper end of said stand and said pan where said device is used as a table;
(d) a hollow, truncated pyramidal firebox comprising a plurality of hingedly connected panels, said firebox having a smaller end received within said support member through the opening provided in the upper end of said support member when said device is used as a cooking unit, said firebox being formed with a larger opening located at the upper end thereof projecting upwardly above said pan and said support member, said firebox being folded into a substantially flat configuration for storage between the upper end of said stand and said pan when said device is used as a table,
(e) a fire grate received in said firebox to be supported thereby intermediate said smaller, lower end and said larger, upper end thereof through engagement between said fire grate and the panels of said firebox when said device is used as a cooking unit, said fire grate being stored between the upper end of said stand and said pan when said device is used as a table; and
(f) a cooking grill received in said firebox to be supported thereby above said fire grate and in the vicinity of said larger, upper end of said firebox when said device is used as a cooking unit, said cooking grill being disposed between the upper end of said stand and said pan when said device is used as a table, said cooking grill spanning across the upper surface of said stand when said device is used as a table,
(g) said panels of said support member being hingedly joined together along juxtaposed non-parallel edges and each panel of a pair of confronting panels is hingedly connected intermediate the non-parallel edges thereof, whereby said support member is foldable into a generally flat configuration for storage between the cooking grill and said pan when said device is used as a table,
(h) said panels of aid firebox being hingedly joined together along juxtaposed non-parallel edges and each panel of a pair of confronting panels of said firebox being hingedly connected intermediate the non-parallel edges thereof, whereby said firebox is hingedly foldable into a generally flat configuration for storage between the cooking grill and said pan when said device is used as a table.

12. A device as claimed in claim 11 and comprising a panel hingedly attached to a panel of said support member other than said confronting pair of panels of said support member for being disposed across the smaller open end of said firebox for protecting said pan.

13. A cooking device as claimed in claim 11 and comprising a hollow, truncated pyramidal hood disposed on said firebox at the upper end thereof when said device is used as a cooking unit, said hood comprising a plurality of hingedly connected side panels, each side panel of a confronting pair of side panels of said hood comprises adjacent plates hingedly connected for folding said hood into a generally flat configuration, said hood further comprises a top panel having a separable top section hingedly connected to one of side panels of said hood other than said confronting pair of side panels of said hood.

14. A cooking device as claimed in claim 13 wherein said pan has flanges along the perimeter thereof, said flanges being disposed downwardly to depend from said pan when said device is used as a table, and said flanges being disposed upwardly upstanding from said pan when said device is used as a cooking unit.

15. A device interchangeably used as a cooking unit and as a suspended support comprising:
a frame;
means connected to said frame for suspending said frame;
a pan disposed on said frame to be supported thereby when said device is used as a cooking unit, said pan providing a support surface spanning across said frame when said device is used as a suspended support;
a hollow, truncated pyramidal support member comprising a plurality of hingedly connected panels, said support member when extended to be used as part of said cooking unit having a wider, lower end disposable on said pan and a smaller, upper end projecting above said pan, said support member being foldable into a relatively flat configuration for storage between said frame and said pan when said device is used as a suspended support; and
a hollow, truncated pyramidal firebox comprising a plurality of hingedly connected panels, said firebox having a smaller end received within said support member through the opening provided in the upper end of said support member when said device is used as a cooking unit, said firebox being formed with a larger opening located at the upper end thereof projecting upwardly above said pan and said support member, said firebox being folded into a substantially flat configuration for storage between said frame and said pan when said device is used as a suspended support.

16. A cooking unit comprising:
   (a) a first hollow open-ended member having a truncated pyramidal configuration, and having a smaller open end, said first member comprising a plurality of first panels, each of said first panels having a trapezoidal configuration;
   (b) a second hollow open-ended member having an inverted truncated pyramidal configuration and having a smaller open end, said second member comprising a plurality of second panels, each of said second panels having a trapezoidal configuration, said second member being disposed above said first member and in axial alignment therewith, said smaller open ends of said first member and said second member being disposed in telescoping relation;
   (c) first hinge means hingedly connecting adjacent nonparallel edges of said first panels of said first member for folding and extending said first member;
   (d) second hinge means hingedly connecting adjacent nonparallel edges of said second panels of said second member for folding and extending said second member;
   (e) a cooking grill supported by said second member; and
   (f) a hood disposed on said second member, said hood comprising side panels having trapezoidal configurations and adjacent non-parallel edges of said panels being hingedly connected for folding and extending said hood.

17. A cooking unit as claimed in claim 16 wherein each panel of a confronting pair of first panels of said first member comprises adjacent plates hingedly connected for folding said first member into a generally flat configuration, and wherein each panel of a confronting pair of panels of said second member comprises adjacent plates hingedly connected for folding said second member into a generally flat configuration.

* * * * *